J. FISCHER.
Process of Securing Molded Glass Stones to Metallic Frames.
No. 225,816.　　　Patented Mar. 23, 1880.
Fig. 1.　　Fig. 2.　　Fig. 3.
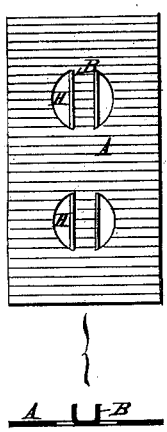
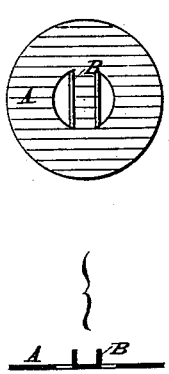
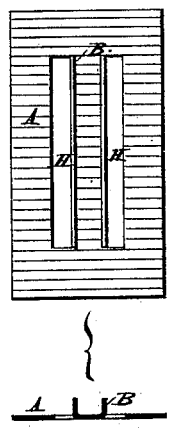
Fig. 4.　　Fig. 5.　　Fig. 6.
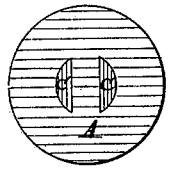
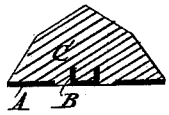
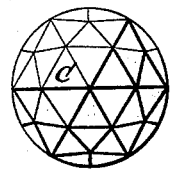
Fig. 7.
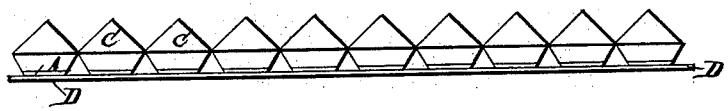
WITNESSES:
Achilles Schehl.
C. Sedgwick
INVENTOR:
J. Fischer
BY Munn & Co
ATTORNEYS.

UNITED STATES PATENT OFFICE.

JOHANN FISCHER, OF TANNWALD, BOHEMIA, AUSTRIA, ASSIGNOR TO JOHN THOMPSON, OF NEW YORK, N. Y.

PROCESS OF SECURING MOLDED GLASS STONES TO METALLIC FRAMES.

SPECIFICATION forming part of Letters Patent No. 225,816, dated March 23, 1880.

Application filed August 20, 1879. Patented in Austria, March 29, 1879.

*To all whom it may concern:*

Be it known that I, JOHANN FISCHER, of Tannwald, Bohemia, Austria, have invented a new and Improved Mode of Attaching Molded Glass Stones to Metals, of which the following is a specification.

The object of my invention, for which I have received a patent in Austria, dated March 29, 1879, No. 4,651, is to produce molded glass stones which can be easily attached or soldered to metal and are simple in construction.

The invention consists in attaching a thin metal plate to the under side of the molded glass stone when the same is in a soft state, and then soldering this plate on the under side of the stone to the metal frame or plate of ornaments, jewelry, &c.

In the accompanying drawings, Figures 1, 2, and 3 represent the top view and cross-section of the metal plates that are to be attached to the under side of the stones. Fig. 4 represents the under side of the stone with the plate attached. Fig. 5 represents a vertical cross-section, and Fig. 6 a top view, of the stone. Fig. 7 represents a row of stones soldered to a metal frame or plate.

Similar letters of reference indicate corresponding parts.

A A represent thin metal plates, which may be of any desired size or shape, and have the parts H H punched out in such a manner that the metal is bent upward and forms the lugs or ears B B.

There may be two or more slots, and they may be semicircular, as shown in Figs. 1 and 2, or longitudinal, as shown in Fig. 3, or of any other suitable shape and size. One of these slotted plates A is placed into the glass mold so that the ears B B project upward, a quantity of soft glass is placed onto this plate, and the mold is closed.

The ears will be forced into the soft glass, and when the latter cools will be perfectly attached to it, as is shown in Figs. 5 and 6. The stone is then ground and polished, so as to be clearer in its outlines.

The metal plate A on the under side of the stone is cleaned by the ordinary process of dipping, in order to present a clean surface to the solder.

The metal plate or frame D, to which the stone is to be fastened, is covered with some suitable solder, preferably the ordinary tinners' solder, and a coat of zinc dissolved in muriatic acid is applied to the same. The stones are then placed onto the frame or plate in the desired position, and the same is held over the flame of a spirit-lamp for a short time. The solder will melt and connect the frame and the metal plate on the under side of the stone in the most perfect manner.

The stones are to be of glass or some other similar material.

I am aware that it is not new to melt glass and enamel on stems riveted or soldered to perforated metallic mountings; but this necessitates a stone for every hole, a tedious setting of the stones in the holes, and a riveting or soldering for every single peg, including the stone.

What I claim is—

The process of securing glass stones to metallic frames, that consists in forcing ears on plate A into the softened glass and allowing the latter to cool; secondly, grinding the stone and cleaning the surface of the metal; thirdly, covering the frame with a coat of solder and zinc dissolved in muriatic acid; and, finally, placing the stones on the frame and melting the solder, as described.

JOH. FISCHER.

Witnesses:
JOSEF REBSCH,
ERICH RÄHM.